US012681259B2

(12) United States Patent
Yang et al.

(10) Patent No.: US 12,681,259 B2
(45) Date of Patent: Jul. 14, 2026

(54) LENS MODULE

(71) Applicant: SAMSUNG ELECTRO-MECHANICS CO., LTD., Suwon-si (KR)

(72) Inventors: So Mi Yang, Suwon-si (KR); Jae Hyuk Huh, Suwon-si (KR); You Jin Jeong, Suwon-si (KR); Jin Se Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 758 days.

(21) Appl. No.: 17/861,426

(22) Filed: Jul. 11, 2022

(65) Prior Publication Data

US 2023/0314753 A1      Oct. 5, 2023

(30) Foreign Application Priority Data

Mar. 30, 2022    (KR) ........................ 10-2022-0039776

(51) Int. Cl.
*G02B 7/02* (2021.01)

(52) U.S. Cl.
CPC ............. *G02B 7/026* (2013.01); *G02B 7/021* (2013.01)

(58) Field of Classification Search
CPC ......... G02B 7/02; G02B 7/021; G02B 7/022; G02B 7/023; G02B 7/025; G02B 7/026
See application file for complete search history.

(56) References Cited

U.S. PATENT DOCUMENTS

| | | |
|---|---|---|
| 2013/0279032 A1 | 10/2013 | Suigetsu et al. |
| 2016/0085046 A1 | 3/2016 | Kim |
| 2016/0154199 A1 | 6/2016 | Miyano et al. |
| 2016/0202448 A1 | 7/2016 | Okada |
| 2019/0324267 A1* | 10/2019 | Chang .................. G03B 17/12 |
| 2020/0132968 A1* | 4/2020 | Chou ..................... G02B 7/022 |
| 2020/0314301 A1 | 10/2020 | Feng et al. |

(Continued)

FOREIGN PATENT DOCUMENTS

| | | |
|---|---|---|
| CN | 206920679 U | 1/2018 |
| CN | 211180350 U | 8/2020 |
| CN | 113692548 A | 11/2021 |

(Continued)

OTHER PUBLICATIONS

Korean Office Action issued on Aug. 8, 2024, in counterpart Korean Patent Application No. 10-2022-0039776 (7 pages in English, 5 pages in Korean).

(Continued)

*Primary Examiner* — Ephrem Z Mebrahtu
(74) *Attorney, Agent, or Firm* — NSIP Law

(57) ABSTRACT

A lens module is provided. The lens module may include a lens barrel configured to accommodate a lens; and a support member disposed in the lens barrel, and configured to support the lens, wherein the support member includes a first support member formed of a first material, and a second support member formed of a second material different from the first material, wherein the first support member configured to contact and support the lens, and the second support member is disposed to be spaced apart from the lens, wherein a rigidity of the second support member is greater than a rigidity of the first support member.

18 Claims, 6 Drawing Sheets

(56)          References Cited

U.S. PATENT DOCUMENTS

2020/0400948  A1      12/2020  Maric et al.
2021/0389510  A1 *    12/2021  Xu ........................... G02B 1/11

FOREIGN PATENT DOCUMENTS

| | | | |
|---|---|---|---|
| JP | 2010-26034 | A | 2/2010 |
| JP | 5802401 | B2 | 10/2015 |
| JP | 6763029 | B2 | 9/2020 |
| KR | 10-2016-0034766 | A | 3/2016 |
| KR | 10-2016-0063919 | A | 6/2016 |
| TW | 201100895 | A1 | 1/2011 |
| TW | 202041907 | A | 11/2020 |
| WO | WO 2017/200604 | A1 | 11/2017 |

OTHER PUBLICATIONS

Taiwanese Office Action issued on Jan. 6, 2023, in counterpart Taiwanese Patent Application No. 111126803 (6 pages in English, 7 pages in Chinese).
Taiwanese Office Action issued on Aug. 20, 2024, in corresponding Taiwanese Patent Application No. 113111314. (6pages in English, 7pages in Taiwanese).

* cited by examiner

100

40

I - I'

LENS MODULE

CROSS-REFERENCE TO RELATED APPLICATIONS

This application claims the benefit under 35 USC § 119(a) of Korean Patent Application No. 10-2022-0039776, filed on Mar. 30, 2022, in the Korean Intellectual Property Office, the entire disclosure of which is incorporated herein by reference for all purposes.

BACKGROUND

1. Field

The following description relates to a lens module.

2. Description of Related Art

A camera module may be provided with a lens barrel to accommodate a lens therein. The lens may be inserted into the lens barrel and fixed. In this example, there is provided a method of directly bonding the lens in order to fix the lens. In this example, defects in resolution, appearance, or the like may occur due to an influence (lens lifting, lens deterioration, or the like) on the lens in a process of bonding the lens.

To alleviate this issue, the lens may be fixed by implementing a pressing ring. The pressing ring may be inserted into the lens barrel to contact and support the lens. In this example, by fixing the pressing ring to the lens barrel, a lens supported by the pressing ring may also be fixed to the lens barrel.

In the example of implementing the pressing ring, there is an advantage in that reliability may be secured and flare may be prevented, compared to the example of directly bonding the lens. The pressing ring may be generally manufactured in a form of a plastic injecting molding, which has a disadvantage in that rigidity may not be sufficiently secured.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a lens module includes a lens barrel configured to accommodate a lens; and a support member disposed in the lens barrel, and configured to support the lens, wherein the support member comprises a first support member formed of a first material, and a second support member formed of a second material that is different from the first material, wherein the first support member is configured to support the lens, and the second support member is disposed to be spaced apart from the lens, and wherein a rigidity of the second support member is greater than a rigidity of the first support member.

The first support member may be configured to be in contact with the lens to support the lens.

The support member may be configured to have a ring shape.

A portion of a first surface of the first support member in an optical axis direction, may be configured to be in contact with the lens, and at least a portion of a second surface of the first support member in a direction perpendicular to the optical axis, is configured to be in contact with the lens barrel to support the lens.

The first support member may include a step that is disposed on the first surface, and the second support member may be configured to be disposed on the step.

The first surface may be a surface at which the first support member and the lens are in contact.

The second support member may be exposed in the optical axis direction.

The portion of the first surface of the first support member in the optical axis direction further may include a portion that is in contact with the lens barrel.

The first support member may include a step that is disposed on the first surface, wherein the step may be positioned between the portion of the first support member that is in contact with the lens, and the portion of the first support member that is in contact with the lens barrel.

An empty space may be formed between the second support member and the lens.

The support member may include a plurality of protrusions that extend from the second support member, and may be configured to protrude in an outer diameter direction of the first support member.

The plurality of protrusions may be further configured to protrude further toward the lens barrel than a side surface of the first support member on which the plurality of protrusions are disposed.

A side surface of the first support member on which the plurality of protrusions are disposed may be a flat surface.

The plurality of protrusions may be disposed to be spaced apart from each other in a circumferential direction of the second support member.

The support member may be configured in a form of a pressing ring, comprising a first pressing ring and a second pressing ring.

In a general aspect, a lens module includes a lens, a lens barrel, a first pressing ring configured to contact and support the lens; a second pressing ring which is formed of a material, different from a material of the first pressing ring, and integrally formed with the first pressing ring, wherein a surface of the second pressing ring that faces the lens is positioned below a surface of the first pressing ring that is in contact with the lens in an optical axis direction.

A rigidity of the second pressing ring may be greater than a rigidity of the first pressing ring.

A plurality of inclined portions may be formed on an inner circumferential surface of the first pressing ring.

The plurality of inclined portions may be configured to have different inclination angles with respect to an optical axis.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
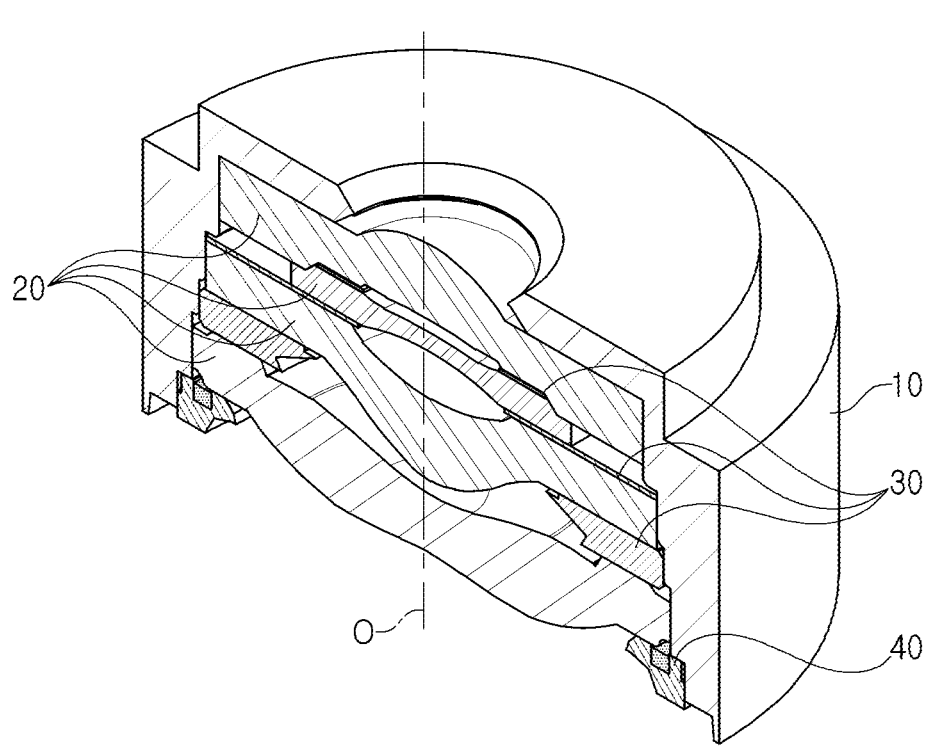
FIG. 1 illustrates a cutaway perspective view of an example lens module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Figure 2:
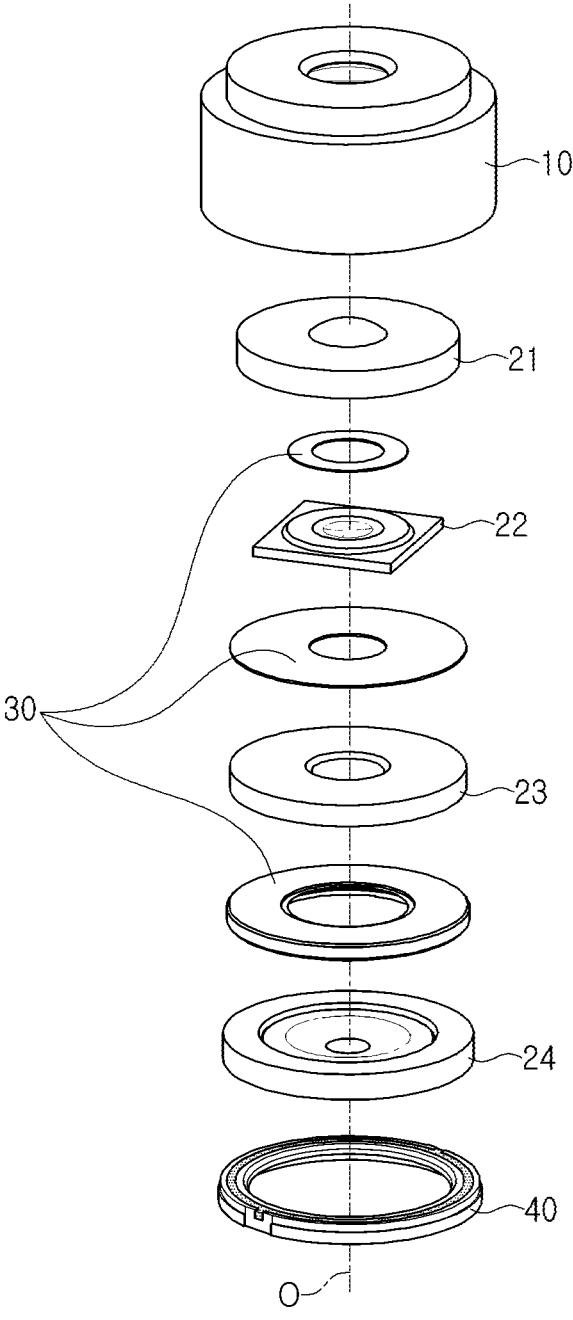
FIG. 2 illustrates an exploded perspective view of an example lens module, in accordance with one or more embodiments.
Figure 3:
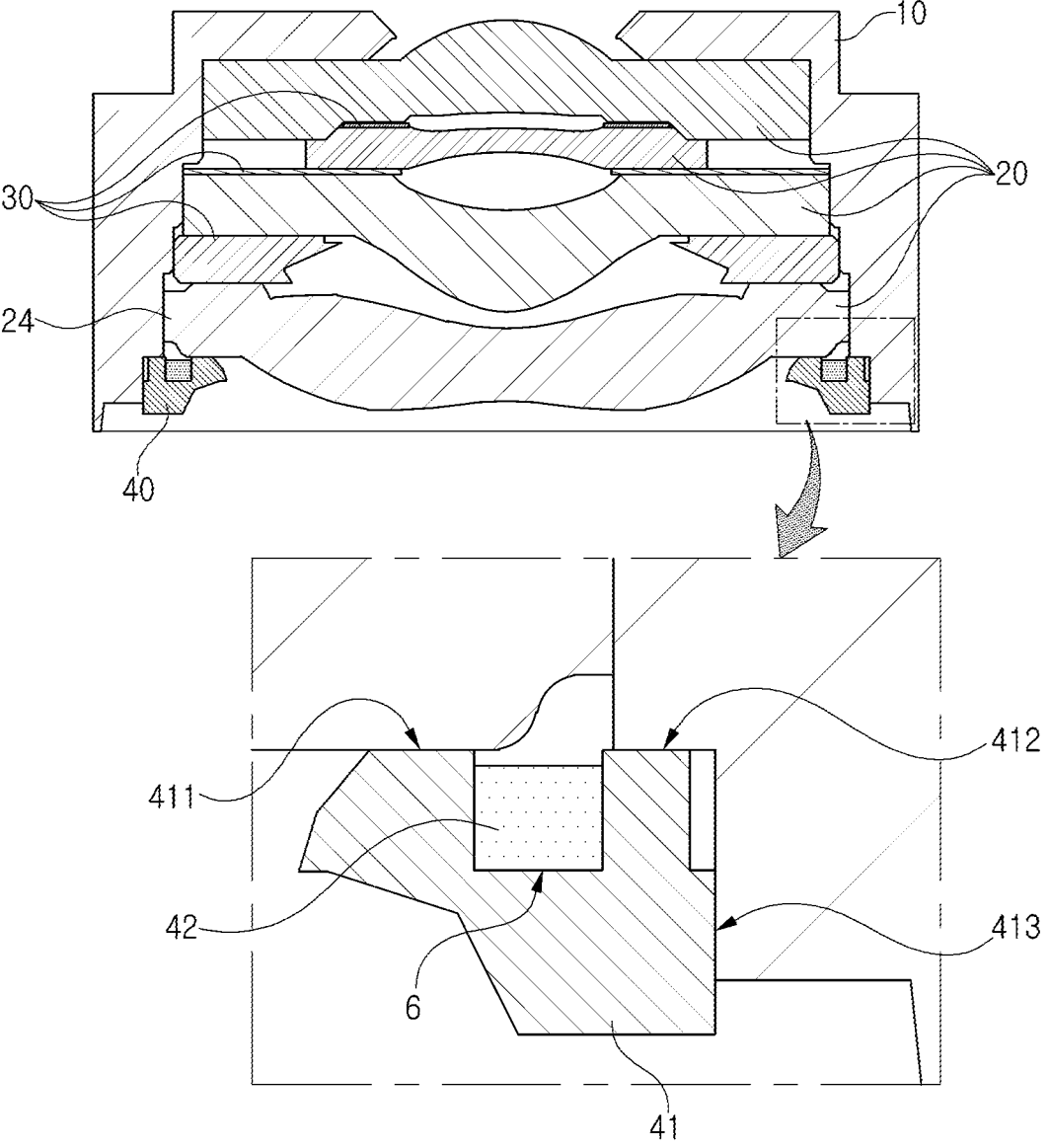
FIG. 3 illustrates a cross-sectional view of an example lens module and an enlarged cross-sectional view of an example support member, in accordance with one or more embodiments.

FIG. 1 illustrates a cutaway perspective view of an example lens module, in accordance with one or more embodiments. FIG. 2 illustrates an exploded perspective view of an example lens module, in accordance with one or more embodiments. FIG. 3 illustrates a cross-sectional view of an example lens module and an enlarged cross-sectional view of an example support member, in accordance with one or more embodiments.

Referring to FIGS. 1 to 2, an example lens module 100, in accordance with one or more embodiments, includes lens 20, a lens barrel 10, and a support member 40. The lens 20 may be disposed in the lens barrel 10, and the support member 40 may be fixed to the lens barrel 10 to support the lens 20. In an example, the lens barrel 10 may include a plurality of lens barrels 10.

Referring to FIG. 2, in one or more examples, a plurality of lenses 21, 22, 23, and 24 may be disposed along an optical axis O. However, the one or more examples are not limited thereto, and the lens module 100 may include at least one lens. When a plurality of lenses 20 are disposed in the plurality of lens barrels 10, the support member 40 may be disposed to support a lens that is disposed closest to an imaging plane among the plurality of lenses 20. The lens module 100 may further include one or more spacers 30 that maintain an interval between the plurality of lenses 20, and that may prevent flare.

In an example, the support member 40 may be manufactured by an injection molding process in a form of a pressing ring. Therefore, in a non-limiting example, with regard to the pressing ring, a first pressing ring, and a second pressing ring, to be described later may have a same configuration as a support member 40, including a first support member 41, and a second support member 42.

In an example, a lens supported by the support member 40 may be the last lens assembled among the plurality of lenses 20 accommodated in the lens barrel 10. Additionally, in an example, a lens supported by the support member 40 in contact therewith may be a lens having the largest size among the plurality of lenses. In the following description, as illustrated in FIG. 2, in an example, the lens that is supported in contact with the support member 40 may be a lens 24 that is located in a lowermost position among the plurality of lenses 21, 22, 23, and 24 accommodated in the lens barrel 10.

The support member 40, in accordance with one or more embodiments, may be in contact with the lens 24, and may fix the lens 24. The pressing ring may be manufactured in a form of plastic injection molding to enable stable bonding with the lens barrel, which may be formed of a plastic material.

However, there is a risk that structural defects may occur because rigidity may not be secured. If the pressing ring that may be formed of a metal material is manufactured to secure rigidity, there may be a problem in that the coupling force with the lens barrel may be weakened. Therefore, the support member 40, in accordance with one or more embodiments, may not be formed of a single material, but may be formed of an injection material of comprising different materials having different rigidity. A material having high rigidity may be added to increase the rigidity, and the coupling force with the lens barrel 10 may be maintained through an original material (such as plastic, or a similar material) of the pressing ring.

Referring to FIG. 3, the support member 40, in accordance with one or more embodiments, may include a first support member 41 and a second support member 42. In an example, the first support member 41 and the second support member 42 may be comprised of different materials. The second support member 42 may be formed of a material that has greater rigidity than the first support member 41. In a non-limiting example, the first support member 41 may be formed of a plastic material, or the like, and the second support member 42 may be formed of a metal material, or the like, which has greater rigidity than plastic. In an example, the second support member 42 may be a non-magnetic metal.

The first support member 41 may fix the lens 24 by being in contact with the lens 24 and the lens barrel 10. The lens 24 may be in contact with a portion 411 of a surface of the first support member 41 in an optical axis O direction, and the lens barrel 10 may be in contact with at least a portion 413 of a surface of the first support member 41 in a direction, perpendicular to the optical axis O. In an example, among portions of a surface of the first support member 41 in the optical axis (O) direction, a portion 412 of the first support member 41, that is not in contact with the lens 24, may be in contact with the lens barrel 10.

In an example, one surface of the first support member 41 may include a step 6. In an example, one surface of the first support member 41 including the step 6 may be a surface in which the first support member 41 and the lens 24 are in contact with each other. As illustrated in FIG. 3, the step 6 may be formed in a form of a groove between a portion 411 of the first support member 41 in which the first support member 41 contacts the lens 24, and a portion 412 of the first support member 41, in which the first support member 41 contacts the lens barrel 10. In this example, heights of the portions 411 and 412 of the first support member 41 that are respectively in contact with the lens 24 and the lens barrel 10 of the portion of the first support member 41 in which the step 6 is formed, may be formed to be the same. However, this is only an example, and the respective heights may be formed to be different from each other.

Figure 4:
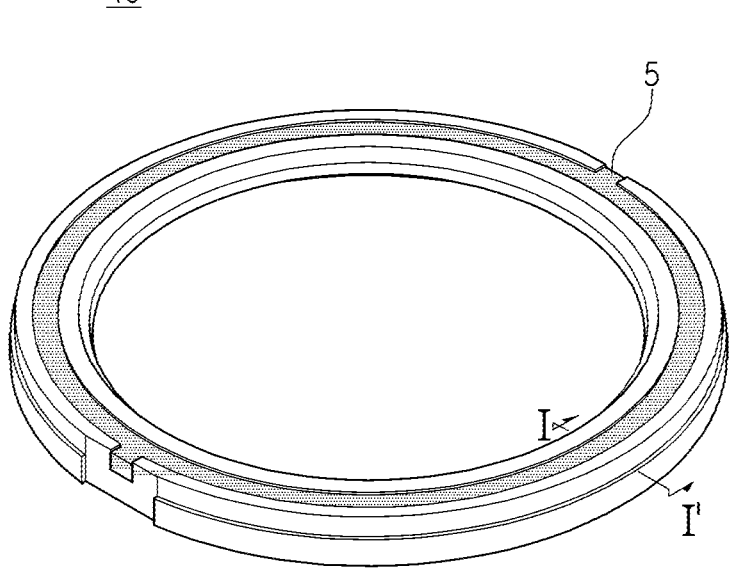
FIG. 4 illustrates a perspective view and a cross-sectional view taken along I-I' of an example support member, in accordance with one or more embodiments.
Figure 4:
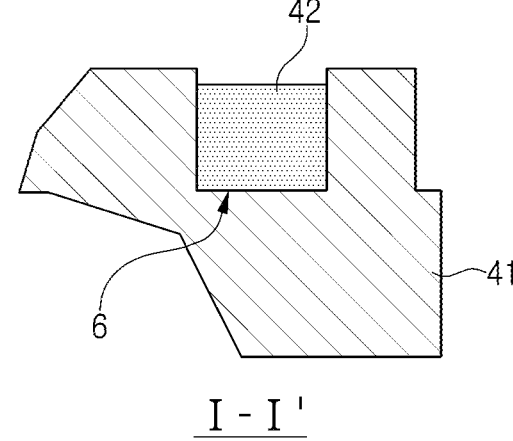

FIG. 4 illustrates a perspective view and a cross-sectional view taken along I-I' of a support member, in accordance with one or more embodiments.

Referring to FIGS. 3 to 4, a second member 42 may be disposed on the step 6 of the first support member 41, and may be exposed in an optical axis (O) direction. The first support member 41 may be in contact with a lens 24 and a lens barrel 10. However, the second support member 42 may be formed to be spatially separate from the lens 24 and the lens barrel 10. In this example, an empty space may be formed between the second support member 42 and the lens 24. This is considering that the second support member 42 is configured to secure the rigidity of the support member 40. That is, by allowing only the first support member 41, which may be formed of a plastic material, or the like having lower rigidity, to contact the lens barrel 10, coupling force between the support member 40 and the lens barrel 10 may be maintained.

Figure 5:
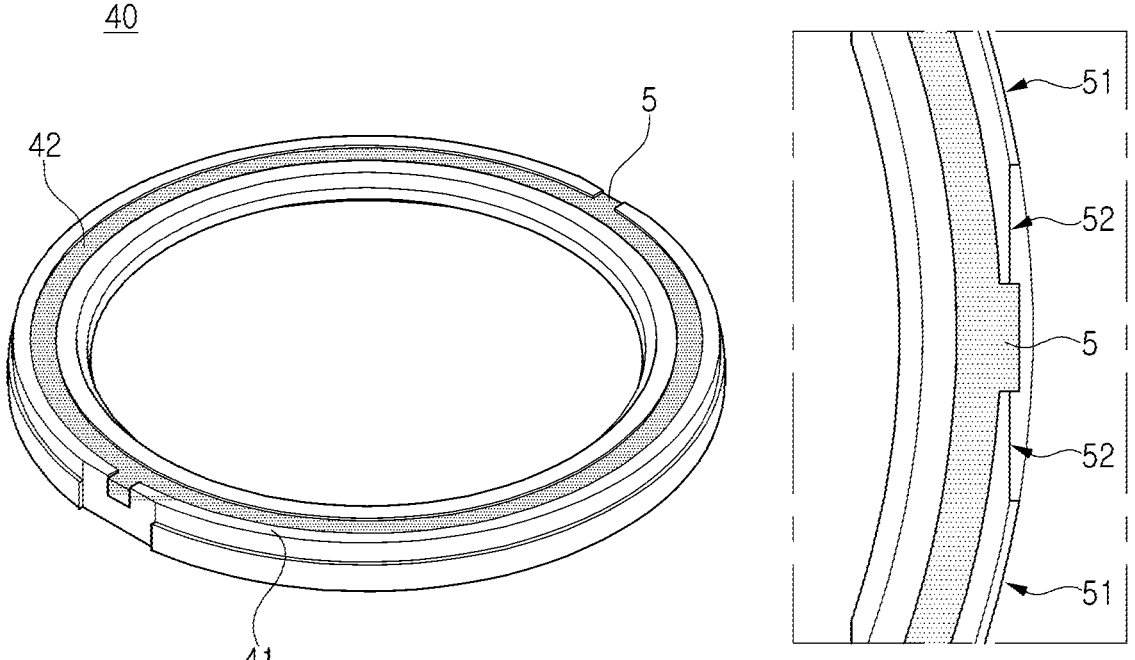
FIG. 5 illustrates a perspective view of an example support member and a partial plan view of the example support member as viewed in an optical axis direction, in accordance with one or more embodiments.

FIG. 5 illustrates a perspective view of an example support member, in accordance with one or more embodiments, and a partial plan view of the example support member as viewed in an optical axis direction.

Referring to FIG. 5, the support member 40, in accordance with one or more embodiments, may include a plurality of protrusions 5. The plurality of protrusions 5 may be formed to extend from the second support member 42 to protrude in an outer diameter direction of the first support member 41. In a non-limited example, the plurality of protrusions 5 may be formed at equal intervals on an outer peripheral surface of the first support member 41. For example, the plurality of protrusions 5 may be disposed to be spaced apart from each other in a circumferential direction of the second support member 42.

In a non-limited example, the shape of the protrusion 5 illustrated in FIG. 5 is a square shape. However, this is only an example, and the protrusion 5 may be implemented in various shapes. In an example, a portion of a side surface of the first support member 41, on which a protrusion 5 is disposed, may be formed as a flat surface. This structure may increase assembly stability during a process of heterogeneous injection molding.

In an example, the plurality of protrusions 5 may be formed to protrude further toward the lens barrel 10 than a portion of a side surface of the first support member 41. The plurality of protrusions 5 may extend from the second support member 42, and in a non-limited example, may be formed of a same material (e.g., metal) as the second support member 42. The second support member 42 may be formed of a material having a higher rigidity than a rigidity of the first support member 41, and the second support member 42 of the lens module 100, in accordance with one or more embodiments, may be formed to be spatially separate from the lens 24 and the lens barrel 10 as described above. Accordingly, as illustrated in FIG. 5, it may be formed so that it does not protrude further than an outer diameter of the first support member 41.

In an example, a side surface of the first support member 41 may include a plurality of first sections 51 having a radius of curvature R and a second section 52 disposed between the plurality of first sections 51. In an example, the second section 52 may have a planar shape. In an example, the plurality of protrusions 5 may be disposed in the second section 52.

As illustrated in the enlarged cross-sectional view of FIG. 5, when viewed in the optical axis (O) direction, the plurality of protrusions 5 may protrude in a direction that is more perpendicular to an optical axis than a plane of the second section 52, and may be disposed inside a virtual curve extending a curved surface of the first section 51.

Figure 6A:
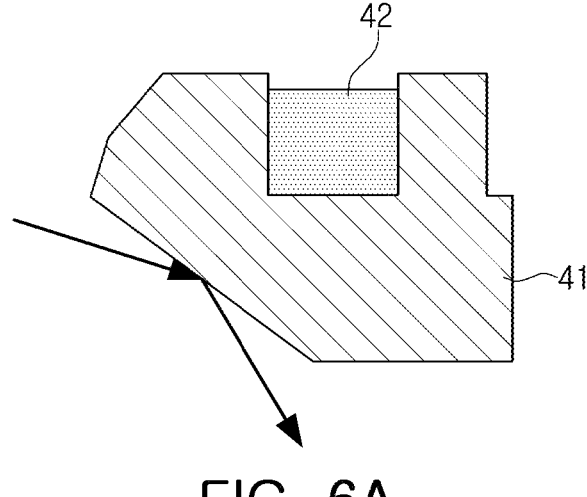
FIG. 6A illustrates a cross-sectional view of an inclined portion of an example support member, in accordance with one or more embodiments.
Figure 6B:
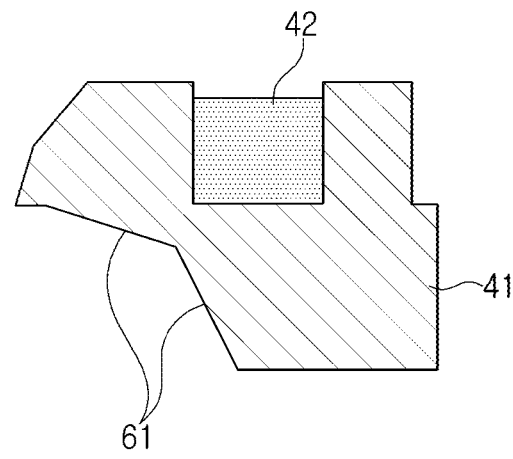
FIG. 6B illustrates a cross-sectional view of an inclined portion of an example support member, in accordance with one or more embodiments.

FIGS. 6A and 6B illustrate cross-sectional views of an inclined portion of an example support member, in accordance with one or more embodiments.

A flare prevention effect resulting from the provision of a plurality of inclined portions will be described. As illustrated in FIG. 6A, when only one inclined portion is formed on an inner circumferential surface of the first pressing ring 41 (e.g., an inner side surface facing an imaging surface), light incident on the lens may be reflected by the inclined portion, and unnecessary light may be incident on the lens.

On the other hand, referring to FIG. 6B, a plurality of inclined portions 61 having different inclination angles with respect to an optical axis may be formed on an inner circumferential surface of the first pressing ring 41. When the plurality of inclined portions 61 are formed, a distance from an optical axis O may be greater than when only one inclined portion is formed. Accordingly, it is possible to prevent unnecessary light from being incident on the lens by minimizing light reflection on the inclined portion.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A lens module, comprising:
a lens barrel configured to accommodate a lens; and
a support member disposed in the lens barrel, and configured to support the lens,
wherein the support member comprises a first support member made of a first material, and a second support member made of a second material that is different from the first material,
wherein the first support member is configured to support the lens, and the second support member is disposed to be spaced apart from the lens and the lens barrel, respectively,
wherein at least a portion of the first support member is configured to be in direct contact with the lens barrel in an optical axis direction, and the second support member is configured to be exposed toward the lens,
wherein a surface of the second support member that is exposed toward the lens is recessed, in the optical axis direction, relative to a surface of the first support member that is in contact with the lens,
wherein the first support member comprises a step disposed on a lens-facing surface thereof, and the second support member is disposed on the step, wherein at least a portion of inner surfaces of the step extends beyond the second support member and faces each other in a direction perpendicular to the optical axis, and
wherein a rigidity of the second support member is greater than a rigidity of the first support member.

2. The lens module of claim 1, wherein the first support member is configured to be in contact with the lens to support the lens.

3. The lens module of claim 1, wherein the support member is configured to have a ring shape.

4. The lens module of claim 1, wherein a portion of a first surface of the first support member in an optical axis direction, is configured to be in contact with the lens, and at least a portion of a second surface of the first support member in a direction perpendicular to the optical axis, is configured to be in contact with the lens barrel to support the lens.

5. The lens module of claim 1, wherein the first surface is a surface at which the first support member and the lens are in contact.

6. The lens module of claim 5, wherein the second support member is exposed in the optical axis direction.

7. The lens module of claim 4, wherein the portion of the first surface of the first support member in the optical axis direction further comprises a portion that is in contact with the lens barrel.

8. The lens module of claim 7,
wherein the step is positioned between the portion of the first support member that is in contact with the lens, and the portion of the first support member that is in contact with the lens barrel.

9. The lens module of claim 4, wherein an empty space is disposed between the second support member and the lens.

10. The lens module of claim 4, wherein the support member comprises a plurality of protrusions that extend from the second support member, and are configured to protrude in an outer diameter direction of the first support member.

11. The lens module of claim 10, wherein the plurality of protrusions are further configured to protrude further toward the lens barrel than a side surface of the first support member on which the plurality of protrusions are disposed.

12. The lens module of claim 11, wherein a side surface of the first support member on which the plurality of protrusions are disposed is a flat surface.

13. The lens module of claim 10, wherein the plurality of protrusions are disposed to be spaced apart from each other in a circumferential direction of the second support member.

14. The lens module of claim 1, wherein the support member is configured in a form of a pressing ring, comprising a first pressing ring and a second pressing ring.

15. A lens module, comprising:
a lens;
a lens barrel;
a first pressing ring configured to contact and support the lens; and
a second pressing ring made of a material, different from a material of the first pressing ring, and integral with the first pressing ring,
wherein at least a portion of the first pressing ring is configured to be in direct contact with the lens barrel in an optical axis direction, and the second pressing ring is configured to be exposed toward the lens,
wherein the second pressing ring is disposed to be spaced apart from the lens and the lens barrel, respectively, wherein a surface of the second pressing ring that is exposed toward the lens is recessed, in the optical axis direction, relative to a surface of the first pressing ring that is in contact with the lens, wherein the first pressing ring comprises a step disposed on a lens-facing surface thereof, and the second pressing ring is disposed on the step, and wherein at least a portion of inner surfaces of the step extends beyond the second pressing ring and faces each other in a direction perpendicular to the optical axis.

16. The lens module of claim 15, wherein a rigidity of the second pressing ring is greater than a rigidity of the first pressing ring.

17. The lens module of claim 15, wherein a plurality of inclined portions are disposed on an inner circumferential surface of the first pressing ring.

18. The lens module of claim 17, wherein the plurality of inclined portions are configured to have different inclination angles with respect to an optical axis.

* * * * *